United States Patent
Lasch et al.

(10) Patent No.: US 6,679,659 B1
(45) Date of Patent: Jan. 20, 2004

(54) MILLING MACHINE COMPRISING A ROTATING, DRIVABLE TOOL SPINDLE

(75) Inventors: Thorsten Lasch, Aspach (DE); Frank Spiegelberg, Aschersleben (DE)

(73) Assignee: Deckel Maho Seebach GmbH (DE)

( * ) Notice: Subject to any disclaimer, the term of this patent is extended or adjusted under 35 U.S.C. 154(b) by 0 days.

(21) Appl. No.: 10/169,678

(22) PCT Filed: Jan. 7, 2000

(86) PCT No.: PCT/EP00/00092

§ 371 (c)(1),
(2), (4) Date: Oct. 7, 2002

(87) PCT Pub. No.: WO01/51247

PCT Pub. Date: Jul. 19, 2001

(51) Int. Cl.[7] ............................................. B23C 1/00
(52) U.S. Cl. ........................ 409/235; 409/137; 409/168
(58) Field of Search ................... 409/235, 137, 409/168, 224, 159, 172; 408/70, 234, 46, 52

(56) References Cited

U.S. PATENT DOCUMENTS

| | | | | |
|---|---|---|---|---|
| 2,302,813 A | * | 11/1942 | Stuhlfauth et al. | 409/225 |
| 2,795,978 A | * | 6/1957 | Kinsey | 408/67 |
| 2,963,725 A | * | 12/1960 | Bredtschneider | 409/185 |
| 3,998,127 A | * | 12/1976 | Romeu | 409/225 |
| 4,102,592 A | * | 7/1978 | Mackinder | 408/46 |
| 4,679,295 A | * | 7/1987 | Lopez | 29/564.8 |
| 4,705,438 A | * | 11/1987 | Zimmerman et al. | 409/132 |
| 4,987,668 A | | 1/1991 | Roesch | 29/568 |
| 5,078,256 A | * | 1/1992 | Hatano et al. | 409/137 |
| 5,117,552 A | * | 6/1992 | Babel | 483/36 |
| 5,294,220 A | | 3/1994 | Ohmstede et al. | 409/137 |
| 6,217,496 B1 | * | 4/2001 | Lindem | 483/30 |

FOREIGN PATENT DOCUMENTS

| | | | |
|---|---|---|---|
| DE | 2521036 | 11/1976 | 27/44 |
| DE | 4102734 | 8/1992 | 1/4 |
| DE | 4317102 | 11/1994 | 3/18 |
| DE | 9830391 | 1/2000 | |
| EP | 0239564 | 9/1987 | 3/6 |
| EP | 0894564 | 2/1999 | 1/25 |
| WO | WO9419147 | 9/1994 | 1/16 |

* cited by examiner

Primary Examiner—Erica Cadugan
Assistant Examiner—Dana D Ross
(74) Attorney, Agent, or Firm—Bourque & Associates, PA

(57) ABSTRACT

A milling machine with a rotating drivable machine tool spindle perpendicular to a work piece stage slanting downward and away from the front side of the machine bed displaceable along the Z-axis that may be displaced via a first carriage along the Y-axis, and via a second carriage along the X-axis on guides mounted to the machine bed. A chip collection chamber is provided behind the work stage surface when in the operating position. The guides for the second carriage are provided on opposing struts of a portal frame parallel to the work tensioning surface, that is connected on its front side by means of lateral front support areas and on its rear side directly with the machine bed.

5 Claims, 5 Drawing Sheets

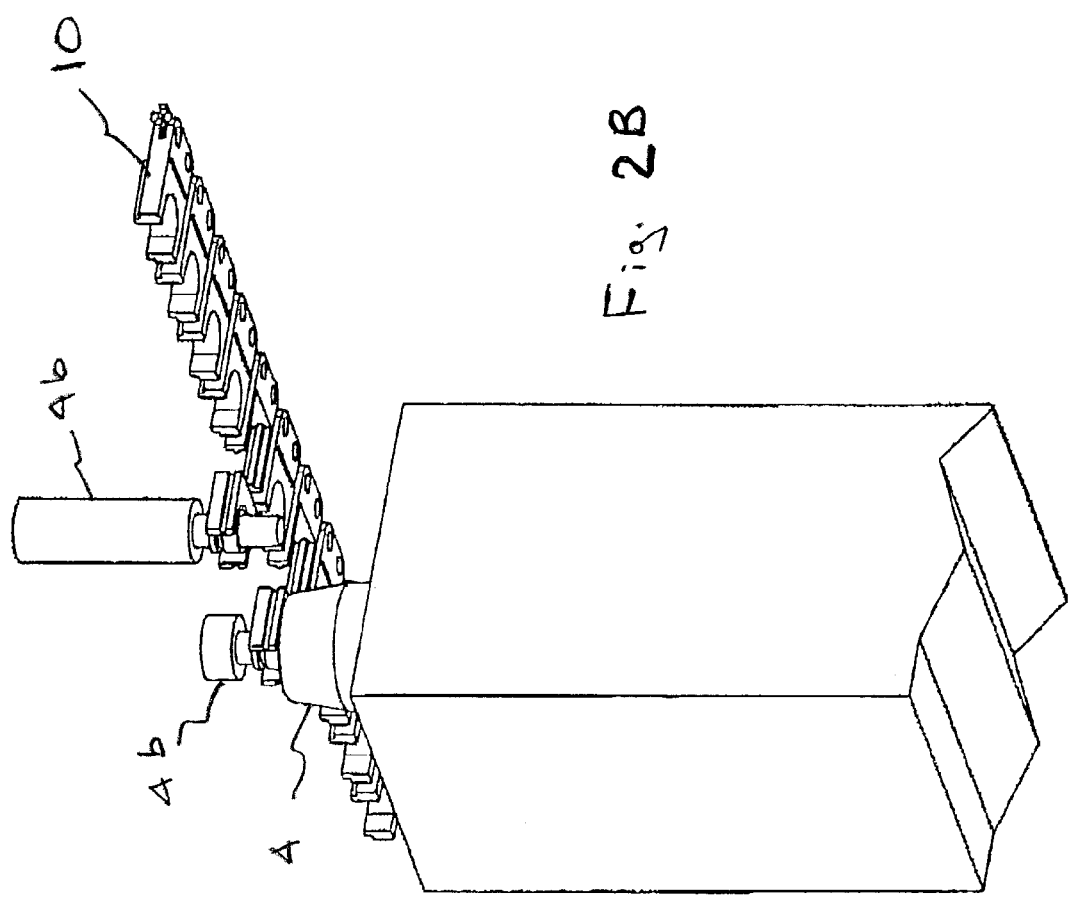

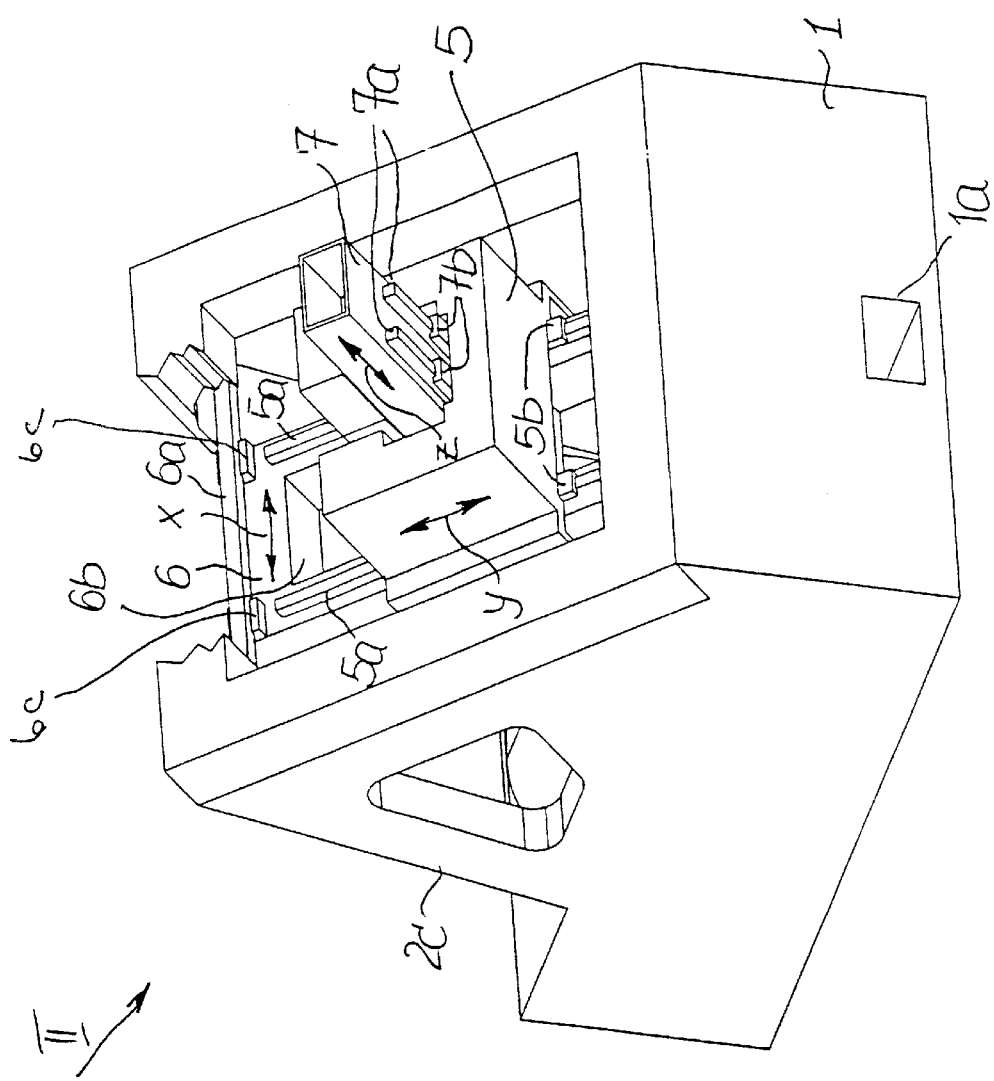

MILLING MACHINE COMPRISING A ROTATING, DRIVABLE TOOL SPINDLE

TECHNICAL FIELD

The invention relates to milling machines.

BACKGROUND INFORMATION

In a known milling machine of the type disclosed in DE 25 21 036 B2, the tool spindle is free to move in a gibbet arrangement on the operator-side end of a Y-carriage, which itself may be moved on an X-carriage. The guides for the X-carriage are located at the rear end of the machine stage in an area behind a chip area extending crosswise.

The volume of chips produced by milling machines can be relatively large. Enlargement of the chip area in the known devices leads to a condition in which the instability arising from the gibbet arrangement in a known machine may be increased because the X-axis guides must move further to the rear on the machine stage, thus increasing the gibbet arm length.

Portal milling machines are also known in which the tool spindle axis extends either horizontally or vertically. In such known machines, the stability of the machine is essentially determined by laterally-mounted connecting cheeks between the machine frame and the guide areas arranged horizontally above.

SUMMARY

Based on the state of the art mentioned above, the invention provides a milling machine that allows the formation of a relatively large chip receptacle volume without interfering with milling machine head movement while providing increased machine stiffness and a compact design.

BRIEF DESCRIPTION OF THE DRAWINGS

These and other features and advantages of the present invention will be better understood by reading the following detailed description, taken together with the drawings wherein:

FIG. 2B is a more detailed perspective side view of the machine tool storage rack of FIG. 2A;

FIG. 3 is a perspective view of the milling machine as in FIG. 1 viewed at an angle from the rear, with exposed front portal cap.

DETAILED DESCRIPTION OF THE PREFERRED EMBODIMENTS

Figure 1:
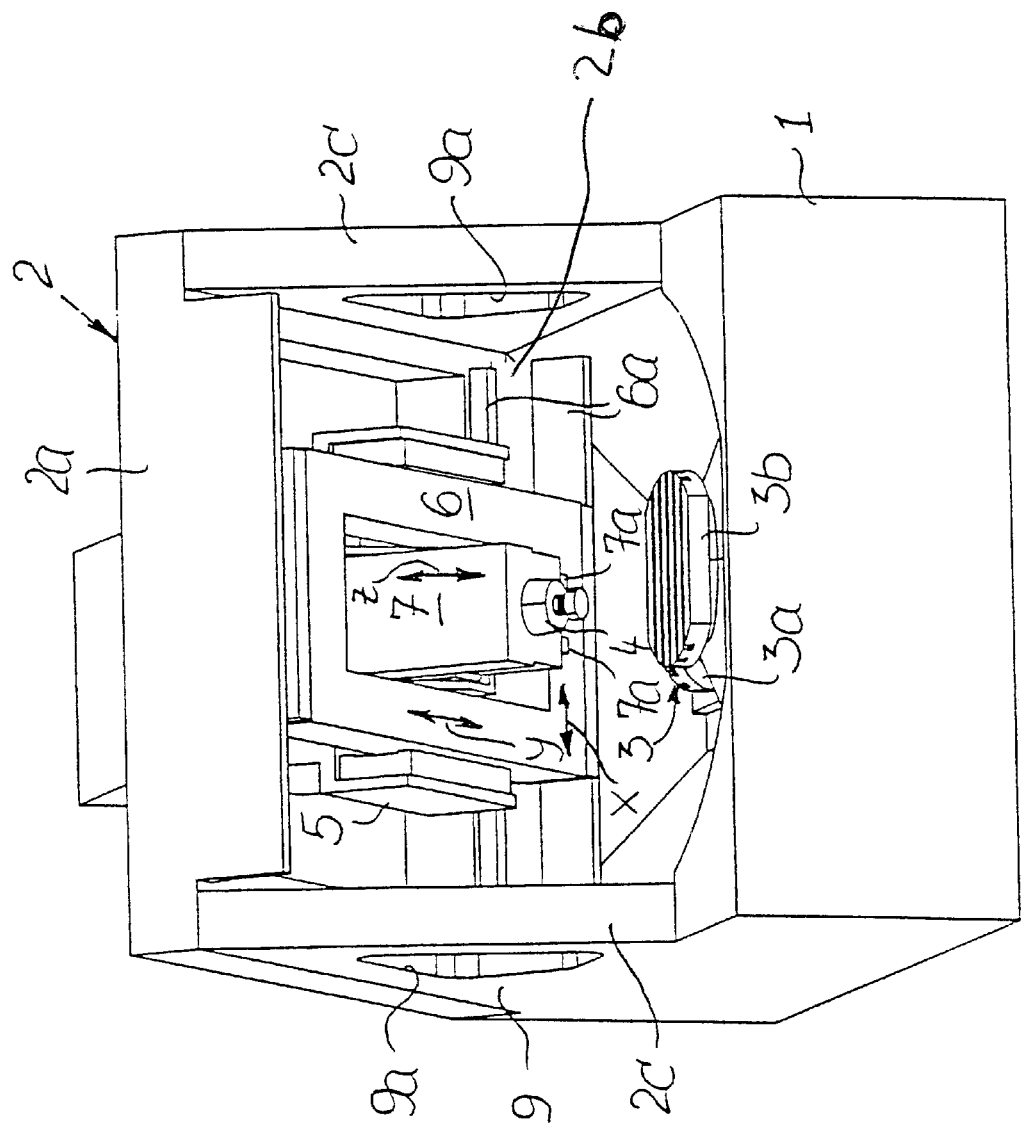
FIG. 1 is a perspective view of a milling machine from the front at an angle with a view into the working chamber.

A machine bed 1, FIG. 1, bears a work stage 3a with a work-tensioning surface 3 inclined to the horizontal. An enclosed portal frame 2, free to move parallel to the work-tensioning surface 3, rests on the machine bed 1 by means of the side cheeks 9 and supporting area 2c. On the side of the milling machine opposite the operating and loading side, the portal frame 2 rests directly on the machine bed 1. The portal frame 2 bears a machine tool spindle 4 moveable through three orthogonal axes X, Y and Z.

For dislocation along the "Z" axis, the machine tool spindle 4 is supported in a carriage 7 that is formed as a headstock. Displacements along the other two dislocation directions in a plane parallel to the work-tensioning surface 3 are achieved along the "Y"-axis by a first carriage 5, and along the "X"-axis by a second carriage 6. A milling tool 4b, FIGS. 2A and 2B, is secured in the machine tool spindle 4.

The side cheeks 9 feature open areas 9a that allow observation of the milling tool 4b and assist in the release process if necessary. An additional work stage 3b is supported on the machine bed 1 in a preparation position, whose surface is oriented horizontally, and is capable of pivoting into the preparation position at the location of the work stage 3a. Because of the horizontal orientation of the work-tensioning surface in its preparation position, the release of a processed piece of work and the securing of a raw piece are simplified.

Figure 2A:
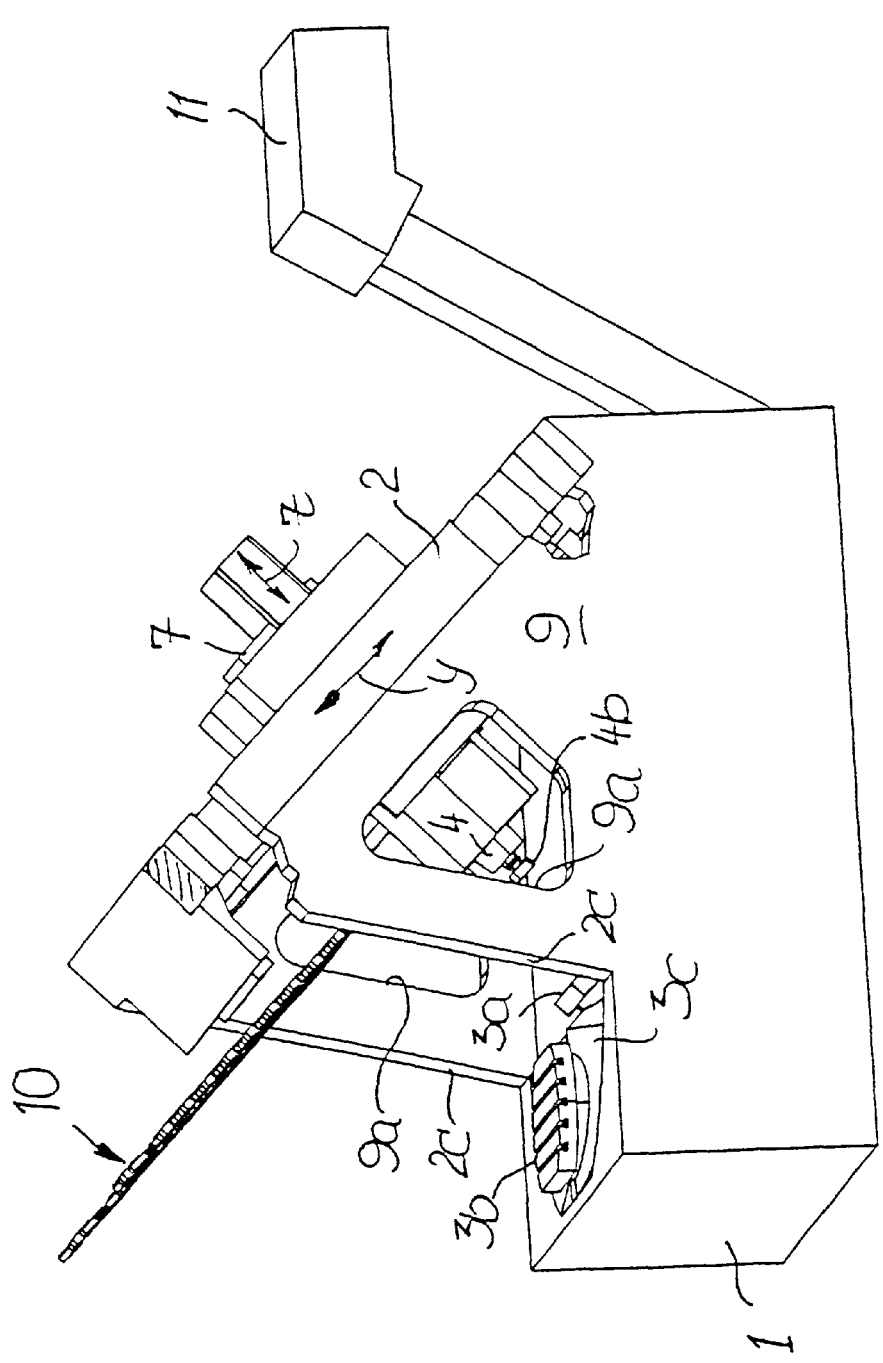
FIG. 2A is a perspective side view of the milling machine as in FIG. 1 viewed along the direction of Arrow II in FIG. 3, with exposed corner areas of the portal frame.
Figure 4:
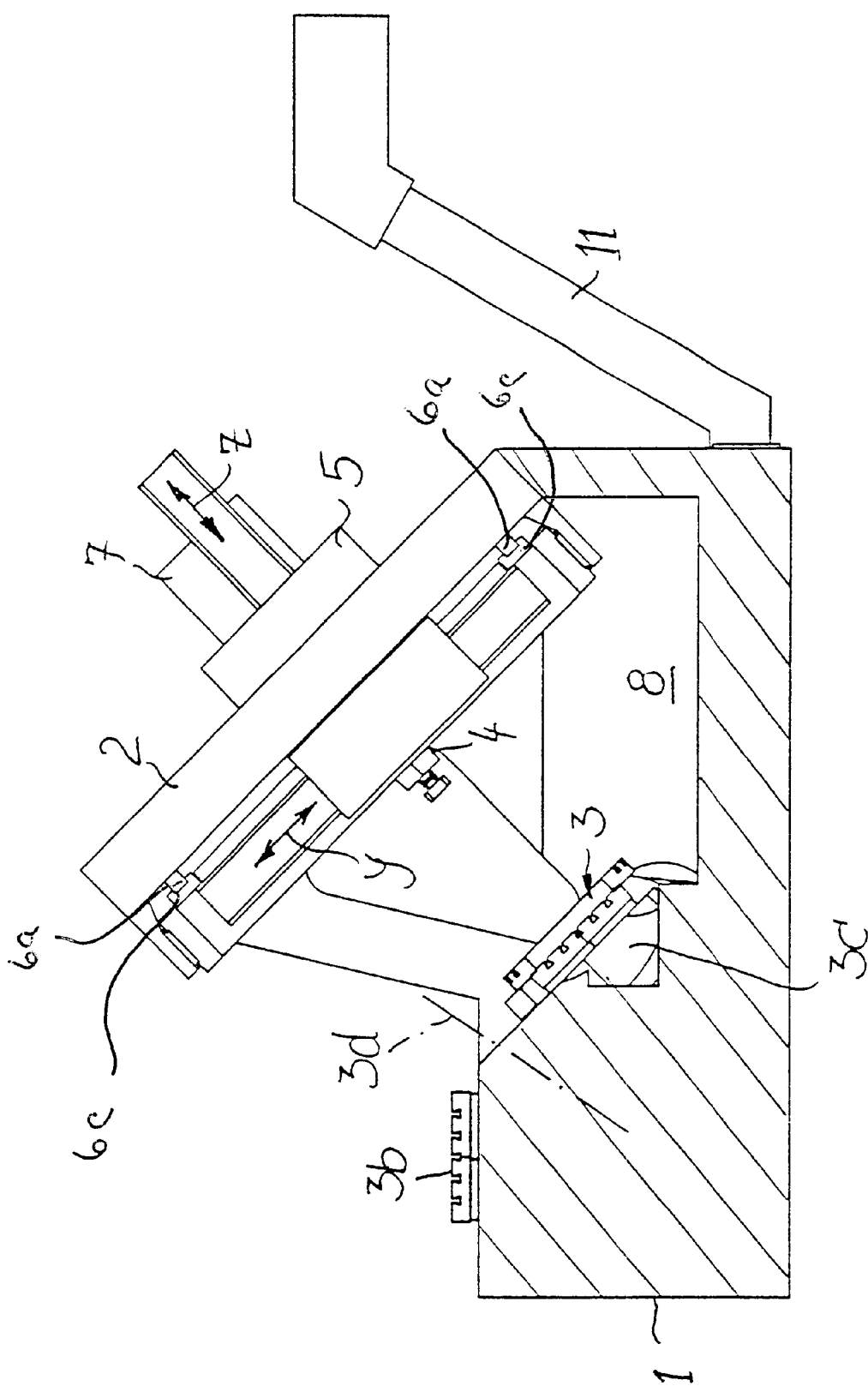
FIG. 4 is a side view of the milling machine as in FIG. 1 in which the side cheek is omitted on the side from which the machine is viewed, and the area of the machine behind it is shown in a partial cutaway view.

FIG. 2A shows an embodiment example of the milling machine in accordance with the present invention in which the automatic exchange of the work stages 3a and 3b is possible via a pivoting mechanism 3c. The work stages 3a and 3b pivot about a pivot axis 3d (FIG. 4) that is arranged toward the bisecting line of the angle formed by the horizontal and the oblique work stages. The milling machine is equipped with a chip guide 11. The machine tool spindle 4 is provided from a tool storage rack 10 (see also FIG. 2B) with tools 4b that extend into the movement range of the tool spindle below the portal, so that the tools 4b from the machine tool spindle 4 may be directly retrieved from the tool rack 10.

The guides 6a for the second carriage displaceable along the X-axis are located on the lower cross strut 2b (see FIG. 1) and on the upper cross strut 2a. As FIG. 3 shows, the carriage 6 has guides 5a on its upper surface upon which counter-stays 5b secured to the first carriage 5 slide while stays 6c engage with slides 6a for facilitating movement along the X-axis.

The guides 5a extend along both sides of a section 6b through which the machine tool spindle 4 and the headstock extend, and in which direction they may be displaced. The rear wall of the machine bed 1 includes an opening 1a through which the chip guide 11 shown in FIG. 2A is led to the chip collecting chamber 8.

The first carriage 5 includes guides 7b for the counter-stays of the third carriage 7 formed as a headstock.

The chip collection chamber 8 is directly connected to the work tension surface 3 of the work stage 3a, so that the chips freed upon the release fall into the chip collection chamber 8 by gravity, without the action of a flow upon the chips, where they may be removed through a chip window 1a.

In the embodiment example shown and described, the X-axis extends along the horizontal, while the Y-axis runs along the oblique plane of the portal frame. It is, of course, also possible to use the oblique direction of the portal lateral strut as the X-axis, and the horizontal as the Y-axis.

Instead of the illustrated work stage, other known work stages may be used, e.g., those with two pivot axes. In this manner, processing through five axes is possible.

The loading and unloading of the work may also be performed via palette switch as is well known in the art.

Modifications and substitutions by one of ordinary skill in the art are considered to be within the scope of the present invention, which is not to be limited except by the following claims.

The invention claimed is:

1. A milling machine comprising:

a rotating drivable machine tool spindle displaceable along at least X, Y and Z axes and oriented perpendicular to a work-piece stage in an operating position, said work-piece stage slanting downward and away from a front side of a machine bed, said rotating drivable machine tool spindle displaceable on first guides by means of a first carriage along the Y-axis and via a second carriage along the X-axis on second guides;

a chip collection chamber disposed between the tool spindle and said work-piece stage; and wherein said second guides for the second carriage are provided on opposing struts of a portal frame parallel to the work-piece stage in said operating position, said portal frame connected to the machine bed by means of first and second lateral front support members that extend between the portal frame and the machine bed; and wherein the supported members are side cheeks coupled to the machine bed and the side cheeks include at least one open area.

2. The milling machine as in claim 1, wherein said second guides for the second carriage are mounted on front and rear struts of the portal frame respectively.

3. The milling machine as in claim 1 wherein the first guides of the first carriage extending along the Y-axis interact with a frame forming the second carriage.

4. The milling machine as in claim 1, further including third guides extending along the Z-axis, said third guides mounted on a third carriage that interact with counter-stays mounted on the first carriage.

5. The milling machine as in claim 1, further including a pivot mechanism wherein the work-piece stage is free to pivot about a pivot axis from a preparation position wherein said work-piece stage is substantially perpendicular to the work-piece stage and inclined to the Z-axis from said preparation position into said operating position.

* * * * *